United States Patent [19]

Azuma et al.

[11] Patent Number: 5,590,737
[45] Date of Patent: Jan. 7, 1997

[54] TRAVELING TRANSMISSION FOR A VEHICLE

[75] Inventors: Toshiro Azuma; Masaaki Kojima; Masao Nakayachi; Toshiaki Okanishi; Masashi Inanaga, all of Amagasaki, Japan

[73] Assignee: Kanzaki Kokyukoki Mfg. Co., Ltd., Amagasaki, Japan

[21] Appl. No.: 308,345

[22] Filed: Sep. 19, 1994

[30] Foreign Application Priority Data

Sep. 17, 1993 [JP] Japan .................................. 5-232010

[51] Int. Cl.⁶ ............................................................. B60K 17/354
[52] U.S. Cl. .......................... 180/308; 180/6.48; 180/337
[58] Field of Search ........................................ 180/337, 308, 180/305, 6.48; 192/91 A

[56] References Cited

U.S. PATENT DOCUMENTS

| 2,996,135 | 8/1961 | Grabow | 180/44 |
| 3,655,004 | 4/1972 | Hoashi | 180/6.48 |
| 3,744,584 | 7/1972 | Swift | 180/6.48 |
| 4,577,714 | 3/1986 | Tokunago | 180/308 |
| 5,366,040 | 11/1994 | Irikura et al. | 180/244 |
| 5,394,699 | 3/1995 | Matsufuji | 60/442 |

FOREIGN PATENT DOCUMENTS 49-38826  10/1974  Japan.

*Primary Examiner*—Matthew C. Graham
*Attorney, Agent, or Firm*— Sterne, Kessler, Goldstein & Fox P.L.L.C.

[57] ABSTRACT

A transmission has a pair of hydraulic motors for hydraulically driving crawler type vehicles. The hydraulic motors are connected by a drive train having rotary members. The hydraulic motors are disposed such that a rotary axis of an output shaft on one hydraulic motor is offset from a rotary axis of an output shaft on the other hydraulic motor. A clutch is provided between one output shaft and another rotary member, which is coaxially disposed on the one output shaft. The clutch in accordance with the invention improves the accuracy of straight forward movement of the vehicle. In accordance with the invention, when a steering unit for steering the vehicle is moved to a steering position, for turning the vehicle, and a non-steering position, for straight forward movement of the vehicle, vehicle impact and clutch damage are reduced. The transmission can also be made more compact. In addition, a parking brake can be equipped on the other output shaft.

35 Claims, 14 Drawing Sheets

TRAVELING TRANSMISSION FOR A VEHICLE

BACKGROUND OF THE INVENTION

1. Field of the Invention

The present invention relates to transmission construction. In particular, the invention relates to a transmission for driving a vehicle provided with a crawler type traveling unit.

2. Related Art

Generally, a transmission used for left and right crawler type moving devices is hydraulically driven by a pair of hydraulic motors. The transmission includes a pair of variable displacement hydraulic pumps mechanically connected to an engine on a vehicle. Fixed or variable displacement hydraulic motors, which are fluidly connected with each other to be independently driven by the pair of hydraulic pumps, are laterally disposed. Output shafts of the hydraulic motors are connected through drive trains to left and right axles connected to the left and right crawlers.

The speed of the transmission is controlled by a steering unit for changing the capacities of the hydraulic pumps. To move the vehicle straight forward, the steering unit is put in a straight forward traveling position and the hydraulic motors are controlled such that the number of rotations of each hydraulic motor is equal. As a result, the vehicle should move forward, however, for example, on a marsh land, the number of rotations of left and right crawlers tend to vary, causing the vehicle to unexpectedly meander due to an imbalance in the vehicle's center of gravity when the vehicle leans or tilts, as well as, due to imperfections in the design and construction of the vehicle.

To prevent the vehicle from meandering as discussed above, U.S. Pat. Nos. 2,996,135, 3,655,004 and 3,744,584 provide a clutch to restrict the left and right crawlers. In particular, each clutch is engaged with each other during straight forward movement and both crawlers are forced to rotate at equal rotational speeds to improve the accuracy of the forward movement.

Each clutch engages when the steering unit is in the straight forward travel position for straight forward movement of the vehicle and disengages when the steering unit is in the steering position, that is when the vehicle is being steered in a direction other than straight forward. For example, when the steering unit is immediately restored to the straight forward travel position from the steering position, the number of rotations of the left and right hydraulic motors are temporarily non-coincident with each other due to the play of the link which couples the steering unit with an operating unit of the hydraulic pump. When the clutch engages in this situation, the relative rotation of the motors may subject the vehicle to impact or the clutch may be damaged. Hence, the clutch must be strong enough to withstand such impact and have a sufficiently large capacity. Accordingly, to accommodate the higher reduction ratio, a larger amount of clutching is necessary to transmit a high torque. Therefore, the clutch has to be large-sized.

Also, although not discussed in the above-described patents, a parking braking unit is provided to prevent the vehicle from moving when stopped. However, for the type of vehicle having a pair of hydraulic motors connected through drive trains to left and right crawlers, the left and right crawlers must be braked essentially individually. Therefore, a parking braking unit must be provided for each drive train, thereby increasing the number of parts, which increases expense. Furthermore, to accommodate the higher reduction ratio of the drive train, a larger braking capacity is required.

SUMMARY OF THE INVENTION

The transmission in accordance with the present invention includes a clutch means provided on a vehicle to prevent the vehicle from meandering and to reduce the amount of steering to be done by an operator so that the vehicle will travel straight forward on a marsh or uneven surface without meandering. In addition, in accordance with the invention, when the operator abruptly turns the steering unit from a steering position, for example, for turning the vehicle, to a non-steering straight forward position for straight forward travel of the vehicle, the clutch means can promptly engage without causing an impact on the vehicle. Furthermore, in accordance with the present invention, the clutch means is of a small capacity and substantially small size.

An object of the present invention, therefore, is to provide a transmission with a pair of hydraulic motors for individually driving left and right axles, which are connected to a pair of left and right traveling devices. The drive trains are comprised of rotary members. The drive trains drivingly connect the pair of hydraulic motors with the left and right axles. A clutch means is disposed between the rotary members, which are positioned upstream of power transmission. Clutch means cause the rotary members to engage when the number of rotations of the hydraulic motors are nearly coincident with each other. At least one rotary member in a respective drive train is preferably an output shaft of the hydraulic motor.

A parking brake can be provided on a rotary member in at least one drive train and by selecting to position the parking brake on the rotary members that are positioned upstream of power transmission, the parking brake can be designed to be smaller in capacity to have the parking brake be as small as possible, an output shaft of the hydraulic motor can comprise the rotary member.

The axis of the output shaft of the hydraulic motor on one side of the drive train is disposed to be offset from the axis of the output shaft of the hydraulic motor on the other side of the drive train The rotary member of the drive train on the other side of the transmission is disposed coaxially with respect to the output shaft on the one side and the clutch means is disposed therebetween. The parking brake unit is provided on the output shaft of the hydraulic motor on the other side of the transmission, Accordingly, the clutch means and parking brake can be compactly disposed.. Also, the operator can uniformly apply a braking force to both the left and right traveling devices by operating a single parking brake. The clutch means is preferably a spring loaded type clutch that is engaged by a spring.

A rotation number detection means is included in the drive train so as to detect the number of rotations of the hydraulic motors. A control device is provided which compares the detected numbers of rotations of the hydraulic motors and automatically engages the clutch means when a difference between the detected numbers of rotations is about zero.

The pair of hydraulic motors can be disposed at the left and right exterior surfaces of a single transmission case. In addition, the drive trains, which are also contained in the transmission case extend along the left and right interior surfaces, respectively.

The drive trains and clutch means can be contained in the single transmission case. The clutch means is preferably a multi-disc type hydraulic clutch and is disposed above the oil level in the transmission case. The clutch means includes a lubricating oil discharge port for supplying therethrough lubricating oil to the friction plates and surrounding lubricated portions of the clutch. The discharge port is preferably supplied with oil when the clutch means is engaged. The clutch means, in accordance with the present invention, avoids impact on the vehicle during engagement of the clutch, maintains lubrication, and is very durable to ensure an extended life.

Another object of the present invention is to provide a transmission that has a pair of hydraulic motors for separately driving left and right axles connected to a pair of left and right traveling devices. Drive trains for connecting the pair of hydraulic motors with the left and right axles in a driving manner are disposed with rotation number detection means for detecting the number of rotations of the hydraulic motors, respectively. The drive trains include rotary members positioned upstream in the flow of power transmission with respect to the axles. Disposed between the rotary members are clutch means. When the number of rotation of the hydraulic motors detected by the rotation number detection means are approximately coincident with each other, the clutch automatically operates to mutually engage the rotary members.

A further object of the present invention is to provide a transmission with a pair of hydraulic motors which drive independently left and right axles connected to a pair of traveling devices through the respective drive trains. An output shaft of the hydraulic motor is disposed at one side with respect to the output shaft of the hydraulic motor at the other side such that rotary axes of the output shafts are offset from each other. The output shaft at the one side of the transmission is disposed coaxially with respect to a rotary member of the drive train at the other side of the transmission. Between the output shaft and the rotary member is disposed a clutch means which operates to mutually engage the rotary members when the number of rotations of the hydraulic motors are approximately equal to each other. The output shaft at the other side can be provided with a parking braking unit.

These and other objects of the invention will become more apparent in the detailed description and examples which follow.

DETAILED DESCRIPTION OF PREFERRED EMBODIMENTS

Figure 1:
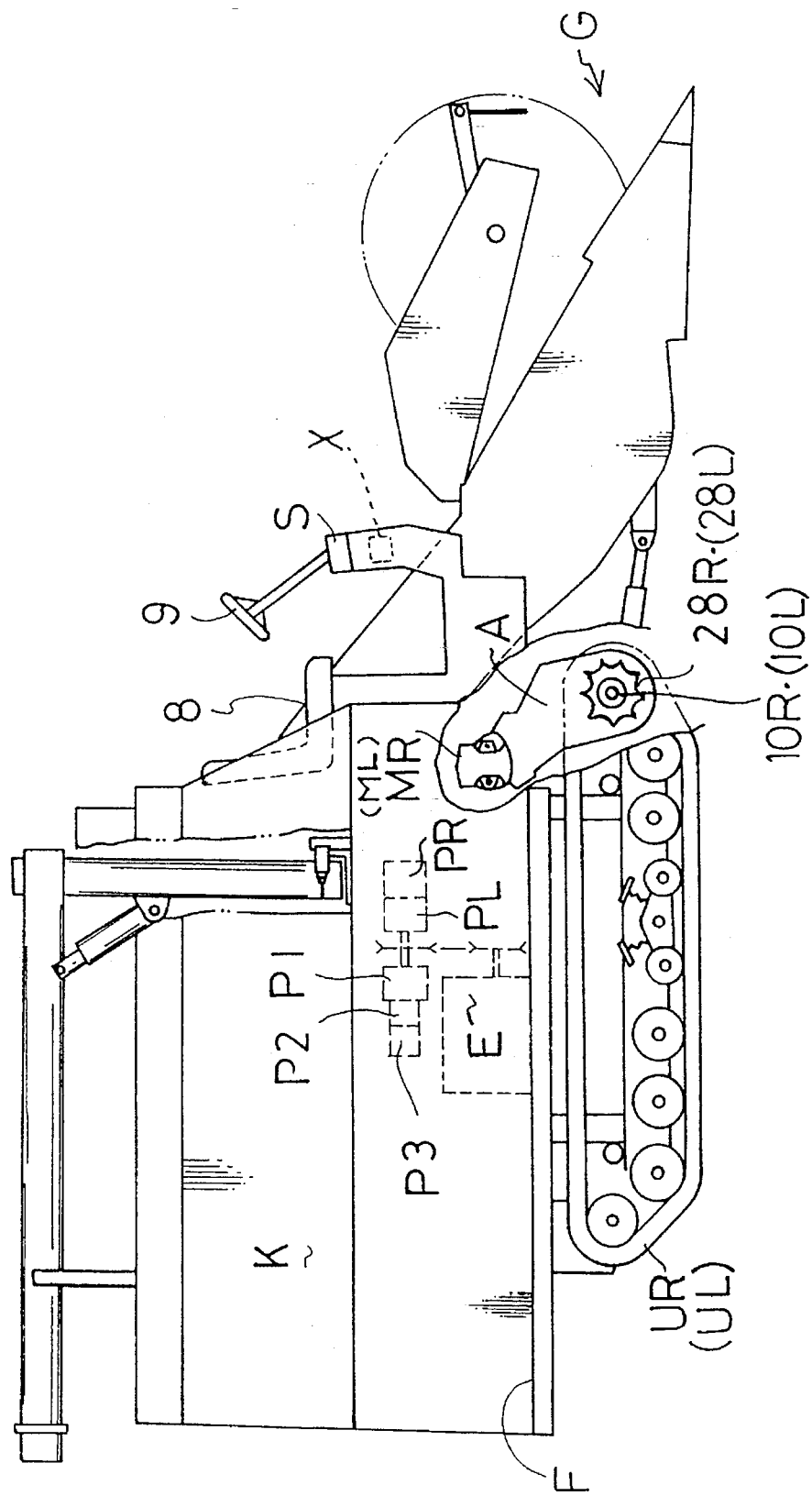
FIG. 1 is a side view of a transmission in accordance with the present invention, which is attached a transmission as a driving apparatus for the combine.
Figure 2:
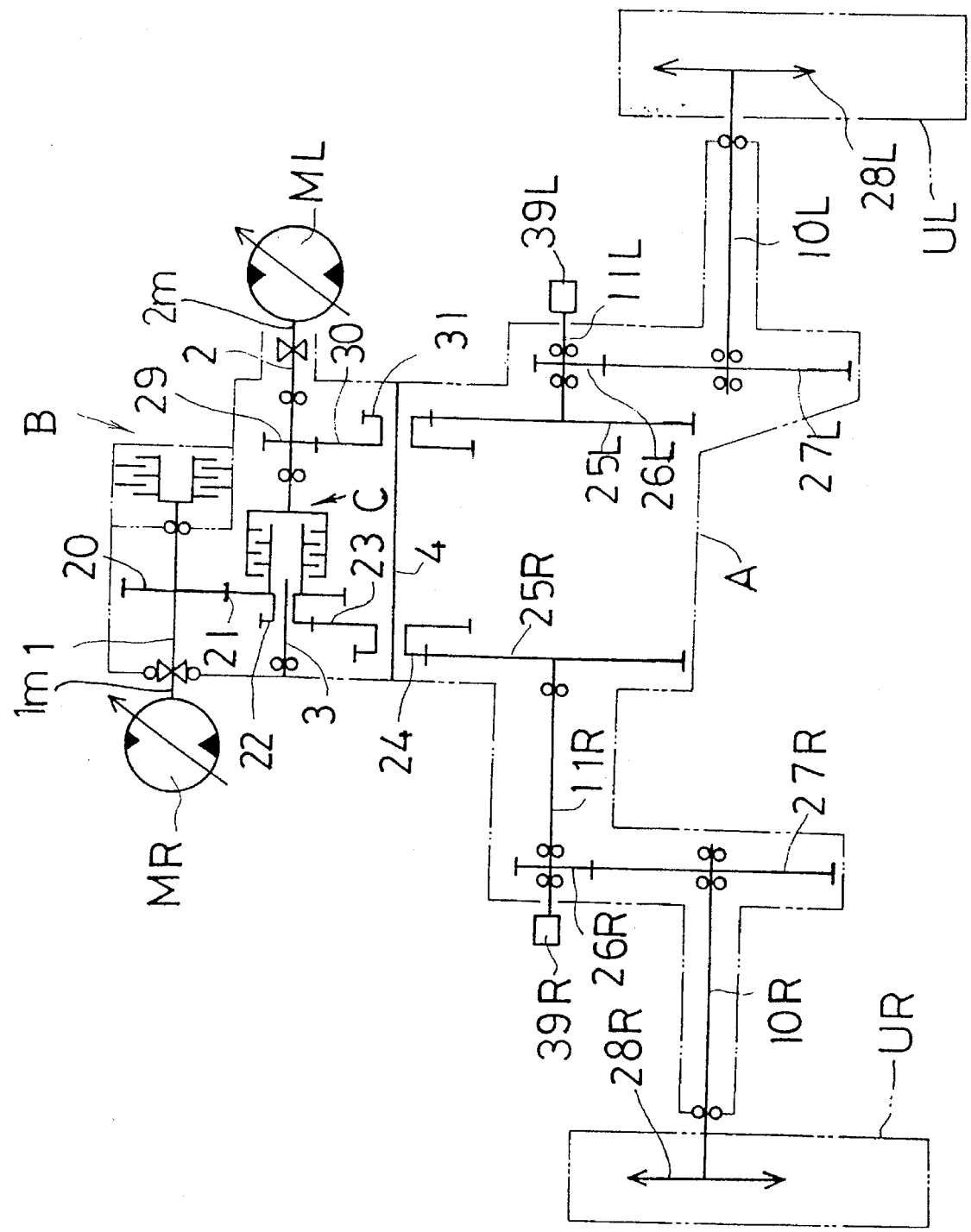
FIG. 2 is a schematic diagram of the transmission in accordance with the present invention.
Figure 3:
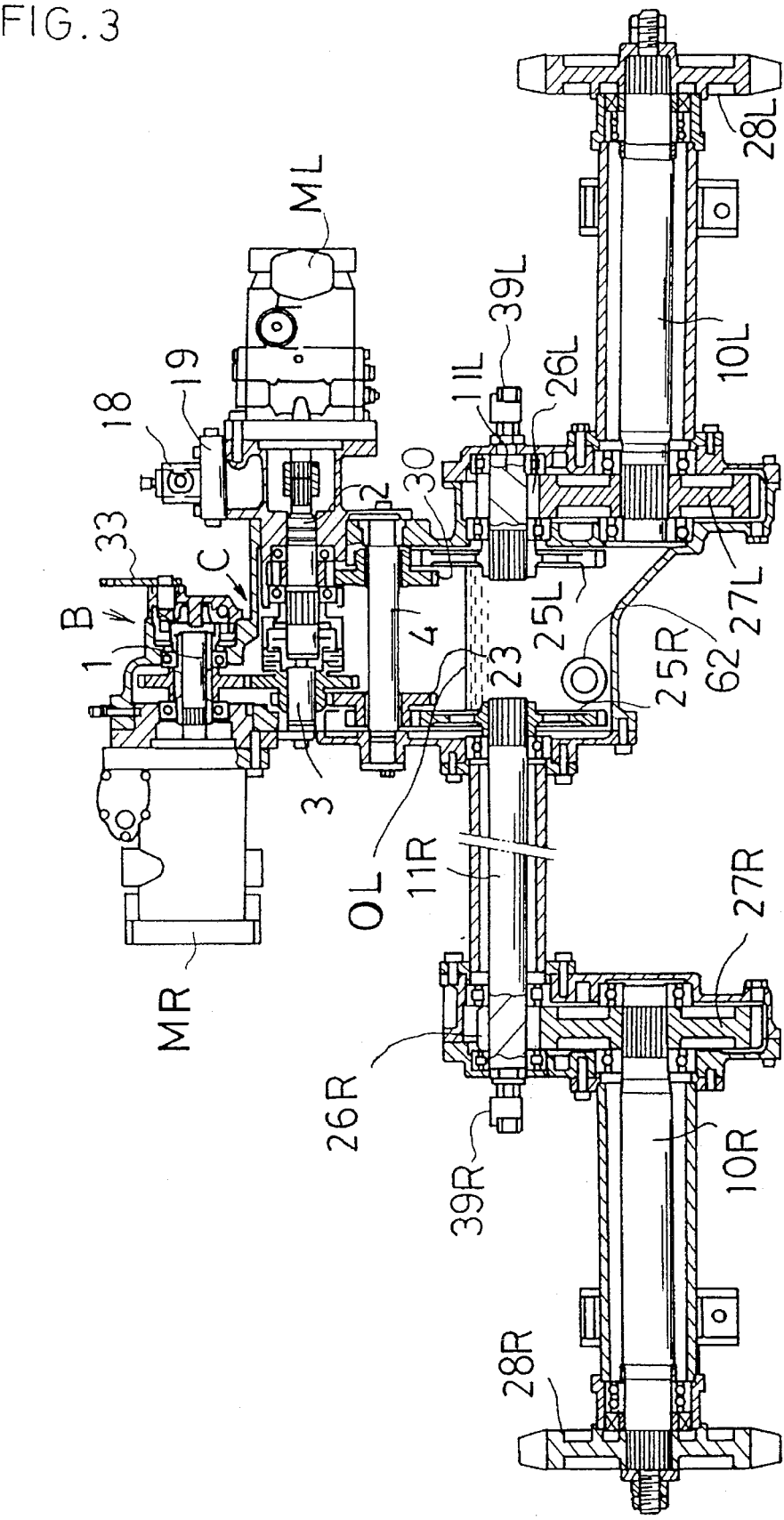
FIG. 3 is a cross-sectional front view of the transmission in accordance with the present invention.
Figure 4:
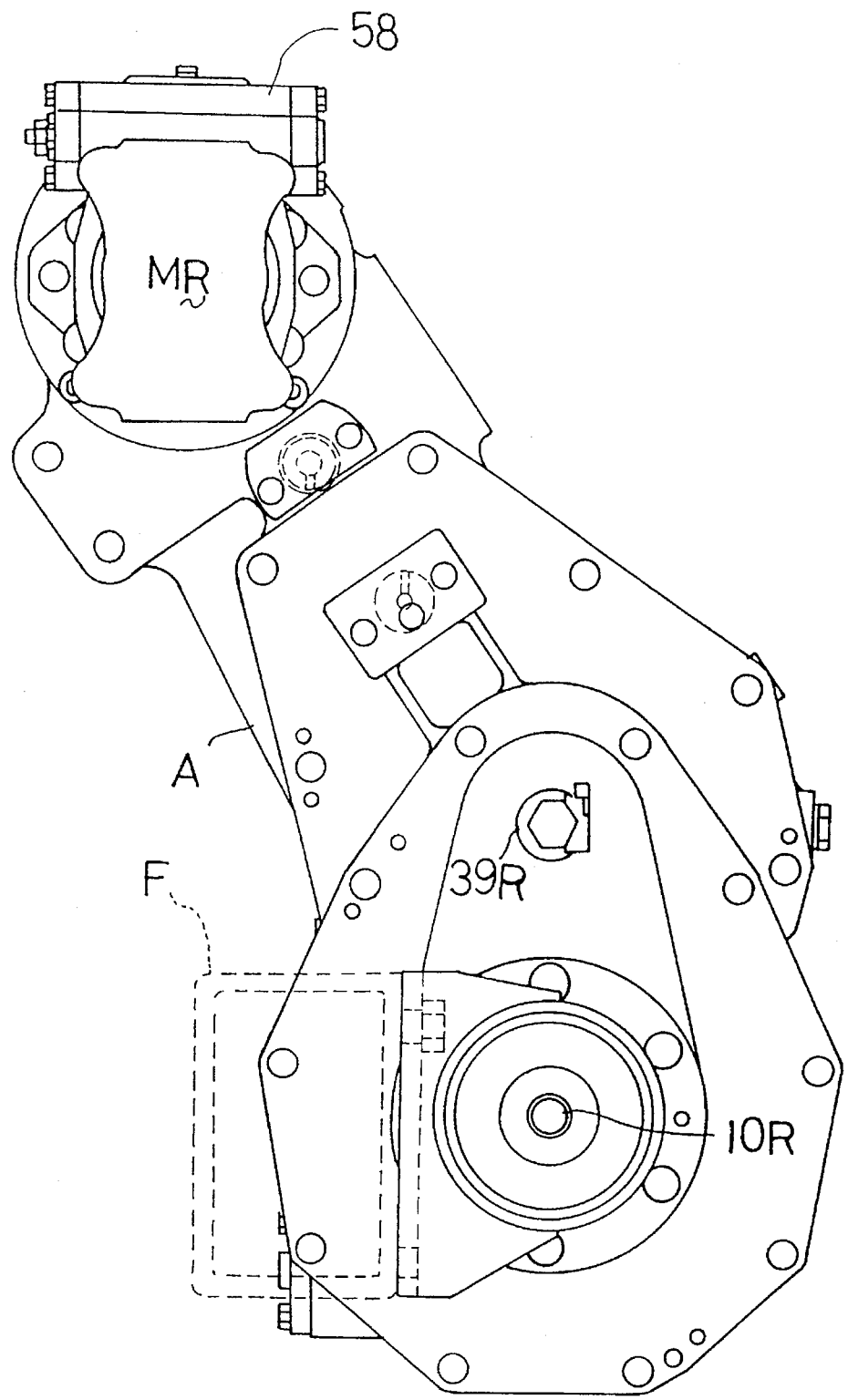
FIG. 4 is a right side view of the transmission in accordance with the present invention.
Figure 5:
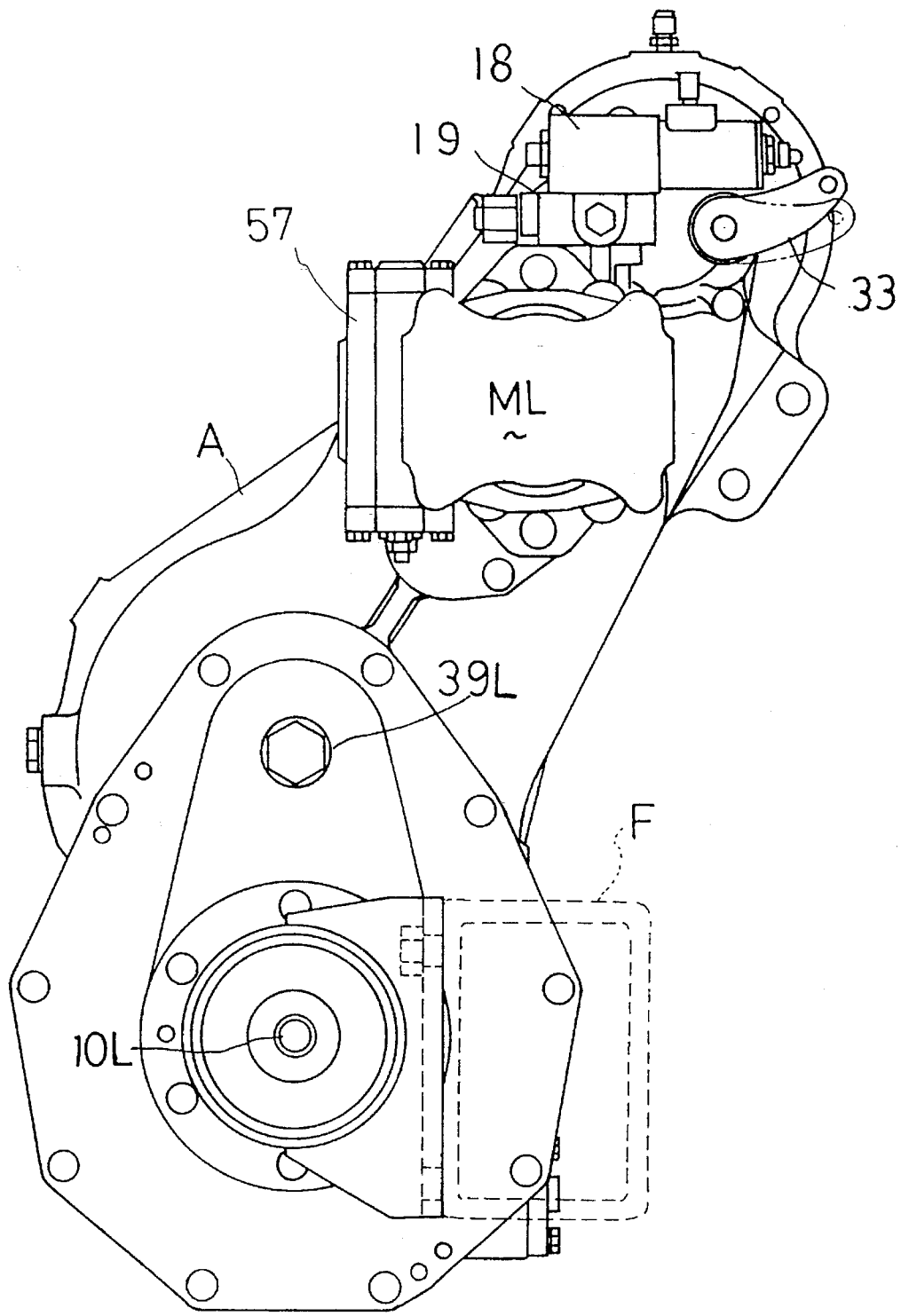
FIG. 5 is a left side view of the transmission in accordance with the present invention.

In FIG. 1, a combine is disclosed as an example of a hydraulically driven vehicle to which the present invention may be adapted. However, it is within the scope of the present invention to use it with any similar type of hydraulically driven vehicle. In FIG. 1, an engine E and a thresher K are disposed on a base F supported on left and right crawler type traveling units UL and UR, respectively. The combine, while moving straight forward on a marsh or other type of uneven surface, operates a reaper-carrier G disposed in front of thresher K to reap crops on the ground which are thrown into thresher K for threshing. The engine E drives thresher K, a pair of hydraulic pumps PR and PL, a second hydraulic pump P1 for a working machine, a charge-pump P2 and a third hydraulic pump P3.

A transmission of the present invention is disposed within a transmission case A. Transmission case A inclines rearwardly toward base F. An upper front portion of case A extends along a lower surface of reaper-carrier G. Axles 10L and 10R project laterally from transmission case A. Sprockets 28L and 28R of the crawler type traveling units UL and UR are mounted on axles 10L and 10R, respectively. Transmission case A and left and right crawler type traveling units UL and UR are connected to each other to form a unitary structure. Hydraulic motors ML and MR, serving as drive sources for traveling units UL and UR, are mounted on left and right exterior surfaces, respectively, of the walls of case A. Pressurized oil is supplied from hydraulic pumps PL and PR to motors ML and MR, respectively, through hydraulic piping.

Hydraulic pumps PL and PR are variable displacement type hydraulic pumps. A pair of operating units (not shown) are provided for changing an angle of a swash plate provided for each respective pumps PL and PR to a desired position. The pair of operating units are linked with a steering unit 9, which is shown as a steering wheel type steering unit disposed in front of a driving cab 8, and a lever type main speed change, unit (not shown).

When steering unit 9 is operated to turn the vehicle, operating arms (also not shown) of the operating units are disposed in different directions with respect to each other. Also, the amount of discharge oil from the hydraulic pumps PL and PR is different with respect to each other, so that the hydraulic motors ML and MR are driven at different speeds. Accordingly, the difference in speeds allows the vehicle to be turned.

When steering unit 9 remains in a nonsteering position, that is in the straight forward travel position, and the lever type main speed change unit is operated, the operating arms are adapted to move at precisely the same time, in the same direction and in an equal amount. This type of linking mechanism is disclosed in, for example, Japanese Utility Model Publication No. Sho 49-38826, which is incorporated herein in its entirety by reference.

A steering detector S for detecting the steering operation of steering unit 9 and a control device X for engaging or disengaging clutch means C are provided at the base of steering unit 9, and are discussed in greater detail below.

Referring now to FIGS. 2–5, an entire route of power transmission in accordance with the present invention will be described. When the hydraulic motors MR and ML are disposed on the left and right exterior surfaces of walls of the single transmission case A, hydraulic motor MR is disposed at the upper portion of the right side-surface of transmission case A and hydraulic motor ML is disposed at the lower portion of the left side-surface of transmission case A and in a direction slightly downward of motor MR. An output shaft 1 connected to a motor shaft 1m of hydraulic motor ML through a coupling is disposed at the right side within transmission case A. A gear 20 is provided on output shaft 1. A parking brake device B is disposed on a projection of output shaft 1 projecting from the left side wall of transmission case A. In this arrangement, parking brake device B is disposed on output shaft 1 to transmit the smallest amount of torque and so that parking brake device B can have a small capacity and be of a small size.

A gear 21 is freely fitted on a support shaft 3 at a lower stage than output shaft 1. Gears 20 and 21 are formed to have an equal number of teeth and when engaged with each other form a uniform speed transmission mechanism. Gear 22 is connected in a driving manner with respect to output shaft 1 of hydraulic motor MR through the uniform speed transmission mechanism. Gear 22 engages with a larger diameter gear 23, which is freely fitted onto the right side of a first reduction shaft 4. A smaller diameter gear 24 is integral with larger diameter gear 23 and engages with a larger diameter gear 25R on one axial end of a second reduction shaft 11R. A smaller diameter gear 26R, on the other axial end of second reduction shaft 11R, engages with a larger diameter gear 27R on the axle 10R. At an outer end of transmission case A, in the vicinity of axle 10R, is mounted a sprocket 28R at the right-side crawler traveling device UR.

An output shaft 2 connected to a motor shaft 2m of hydraulic motor ML through a coupling is disposed at the left side within transmission case A. A gear 29 is provided on output shaft 2 and engages with a larger diameter gear 30 freely fitted on the left portion of first reduction shaft 4. A smaller diameter gear 31, integral with the larger diameter gear 30, engages with a larger diameter gear 25L on one axial end of a second reduction shaft 11L. A smaller diameter gear 26L, on the other axial end of second reduction shaft 11L, engages with a larger diameter gear 27L on the axle 10L. At an outer end of transmission case A, in the vicinity of axle 10L, is mounted a sprocket 28L at the left-side crawler traveling device UL.

The drive trains of the transmission of the present invention therefore comprise (1) the engagement of gears disposed on output shaft 1, support shaft 3, first reduction shaft 4, second reduction shaft 11R and axle 10R; and (2) the engagement of gears disposed on output shaft 2, first reduction shaft 4, second reduction shaft 11L and axle 10L. The right gear 22 and left output shaft 2 form one of the rotary members at the left and right drive trains. For purposes of this discussion, the term "rotary members" generally refers to the rotary gears and shafts. Power in the drive trains flow from the hydraulic motors ML and MR to the axles 10L and 10R, and the drive trains are positioned upstream in the flow of power through the transmission.

The rotary axes of gear 22 and output shaft 2 are coaxially disposed. Output shaft 2 includes a gear 29. Between both gears 22 and 29 is a clutch means C, which is engageable or disengageable with both gears 22 and 29. Clutch means C controls engagement of the rotary members and clutch means C engages the rotary members when the rotational speed of hydraulic motors ML and MR are substantially equal.

As discussed above, motor shafts 1m and 2m of hydraulic motors ML and MR are offset with respect to each other, so that support shaft 3 can be coaxially disposed with respect to output shaft 2, which is connected to motor shaft 2m. Thus, gear 21 on support shaft 3 is connected through gear 20, with output shaft 1, which is connected to motor shaft 1m. Gear 20 provides gear 21 with a uniform speed. Thereby, clutch means C can be disposed between output shaft 2 and gear 21. Also, it is possible to dispose a single parking brake device B at the side of output shaft 1 opposite to hydraulic motor MR.

Figure 6:
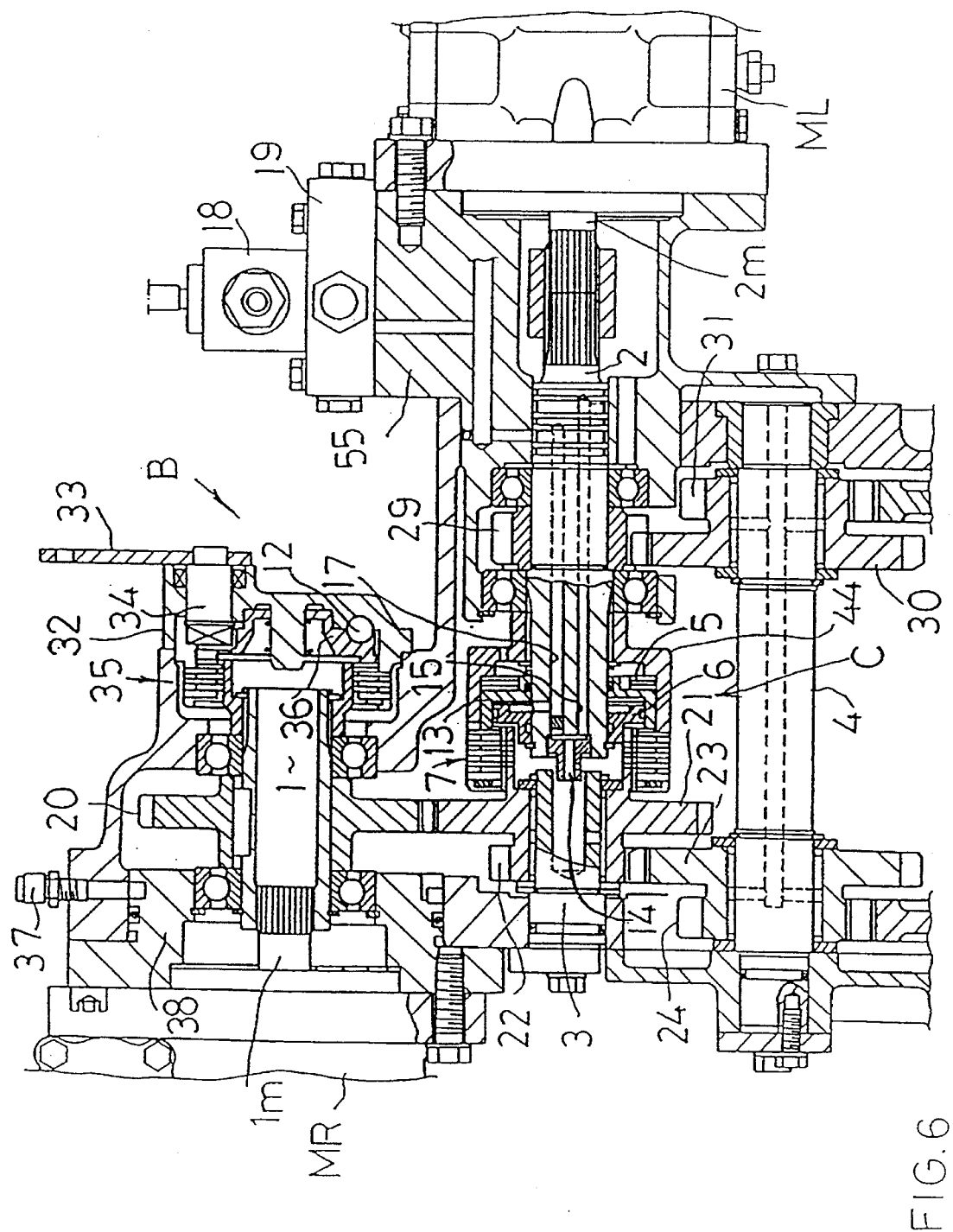
FIG. 6 is an enlarged partial cross-sectional front view, showing a parking brake and clutch means of the transmission in accordance with the present invention.

Next, the parking brake device B, as shown in FIG. 6, is discussed in detail. Output shaft 1 is spline-connected with motor shaft 1m of hydraulic motor MR. Output shaft 1 projects out of the left side-surface of transmission case A and is provided with a plurality of friction plates 35 rotatably fixed but axially slidable along a spline portion on an axial end of the projecting output shaft 1. The plurality of friction plates 35 and a plurality of mating plates are alternately disposed and contained within a brake case 32. The assembly of friction plates 35 and mating plates comprise a type of disc brake which are pressed into contact with each other through an annular brake actuator 36 provided in brake case 32. Brake actuator 36 is pushed toward the direction of the friction plate assembly by a cam means 12 due to rotational displacement around an axis of said assembly.

An operating mechanism for rotational displacement around said axis is constructed as follows:

A cam lever shaft 34 is rotatably connected to brake case 32 and is rotatable around the axis of the assembly. A cam is formed at a portion of cam lever shaft 34 facing the interior of brake case 32. An engaging groove is formed on a circumference of brake actuator 36. The cam faces in the engaging groove. Accordingly, cam lever shaft 34 can be rotated around the axis to enable rotation of brake actuator 36 around the axis. A brake lever 33 is fixed to cam lever shaft 34 at the exterior of brake case 32, and is connected by way of link means (not shown), such as a wire, with a parking brake operating lever (not shown) disposed in the vicinity of the driving cab. The parking brake operating lever is pulled in to exert braking action to parking brake device B.

Next, the clutch means C will be described. The clutch means C is a multi-disc type hydraulic clutch comprising friction plates 7, which lessen the impact caused when gear 22 engages with gear 29, thereby improving the durability of each part. A piston 13 for biasing friction plates 7 is disposed in a clutch case 44 and is axially slidable on the axis of clutch C. Clutch case 44 is coupled with output shaft 2. Between clutch case 44 and a boss integrally extending from gear 21, the plurality of friction plates 7 are collected and supported such that they are only axially slidable on the axis of clutch C. At one side of piston 13 disposed within clutch case 44 is provided an oil chamber 5 for housing springs (for example, a plurality of disc springs) for continuously biasing piston 13 toward a forward moving direction (for pushing the friction plate). At the other side of piston 13 is an oil chamber 6 communicating with an oil passage 17 bored in output shaft 2.

A spring loaded type hydraulic disc clutch is formed such that when pressurized oil is not supplied to oil chamber 6, piston 13 is moved forward by the springs to bias friction plates 7 so that gear 21 (a rotary member of the gear train), and output shaft 2 engage with each other. When pressurized oil is supplied to oil chamber 6, piston 13 retracts and friction plates 7 are released so as to disengage gear 21 from output shaft 2. In the state where engine E is stopped to halt the vehicle, because clutch means C is automatically engaged (by the springs), left and right axles 10L and 10R are connected together. Thus, only a single parking brake device B is necessary to enable braking action to be exerted to both the left and right crawler traveling units UL and UR.

When the vehicle moves straight forward, the pressurized oil is not supplied into oil chamber 6 in order to engage clutch means C. When the vehicle is steered so as to turn the vehicle, pressurized oil is supplied to oil chamber 6 from a hydraulic pump P3 (discussed below) through an oil passage 17 in order to disengage clutch means C. When clutch means C is engaged, pressurized oil is dispersed to lubricate each part in transmission case A from the circumference of friction plates 7 through oil passage 15 bored in output shaft 2 and through discharge port 14, thereby cooling friction plates 7. Some oil from discharge port 14 is ejected into support shaft 3 and first reduction shaft 4 to thereby lubricate gears 21 and 22 and larger diameter gear 23. The rotary members including the clutch means C at the gear train are rotatable at high speed and are disposed above the oil level OL of an oil sump formed in case A, which contains lubricating oil (see FIG. 3). Therefore, pressurized oil of hydraulic pump P3 which is not used for clutch means C, is used to lubricate the rotary members and the lubricated portions. Hence, when the vehicle is traveling straight forward, pressurized oil not used for the spring loaded type of clutch means C can be used as lubricating oil. Furthermore, the amount of lubricating oil in transmission case A can be reduced so that a loss in horse power or heat resulting from agitation resistance is limited. Therefore, an oil cooler 60 (FIG. 8) may be small-sized and, even when the vehicle travels for a long period of time, the oil temperature can be controlled.

A bracket 55 is attached to the upper left surface of transmission case A for mounting hydraulic motor ML. A relief valve 19 (discussed below) and an electromagnetic clutch switching valve 18 are disposed on bracket 55. In a cavity in bracket 55, which receives output shaft 2 is an oil receiving joint connected to oil passages 15 and 17, which are hydraulically connected to an output port of clutch switching valve 18.

Figure 7:
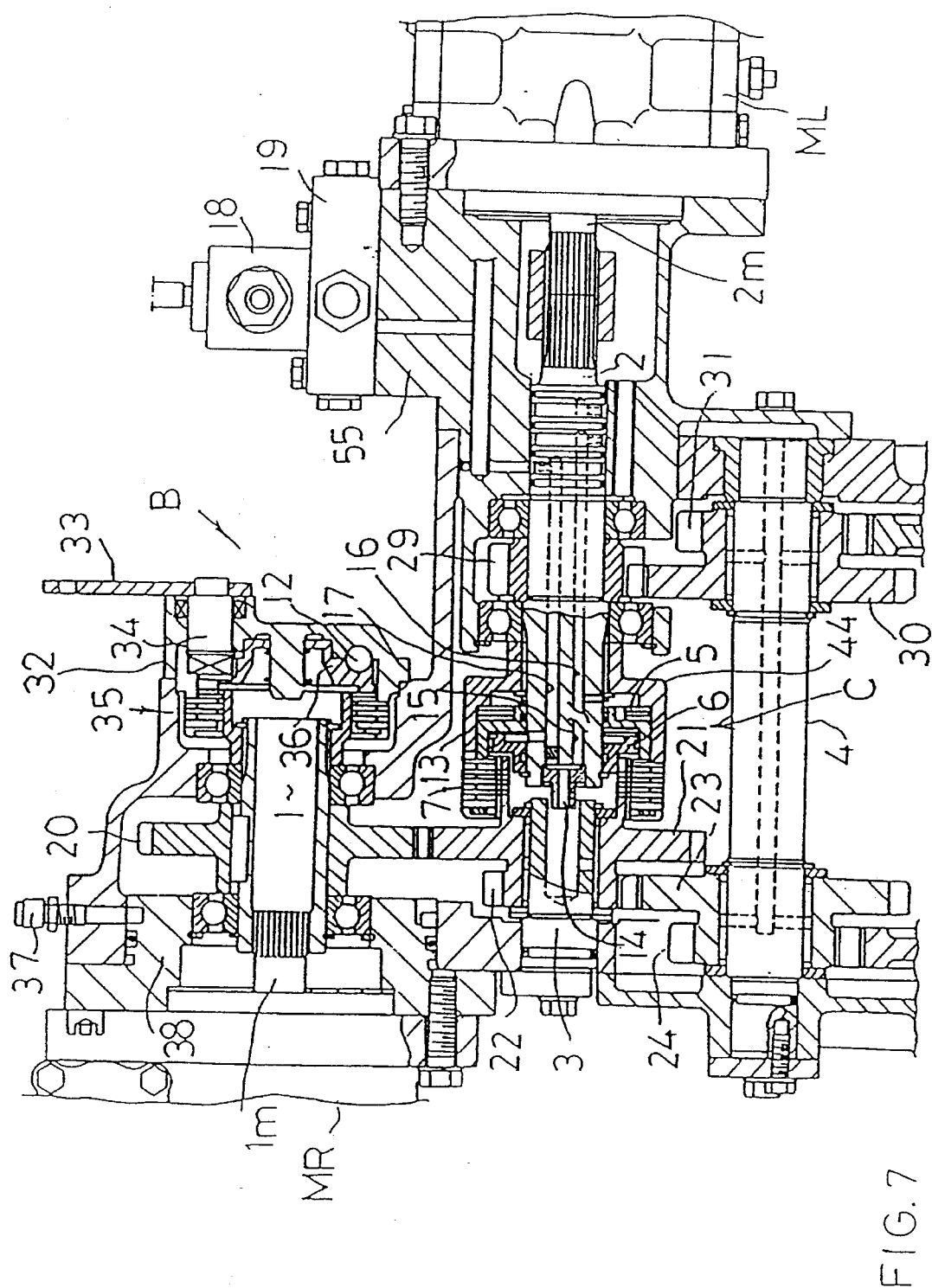
FIG. 7 is an enlarged partial cross-sectional front view, showing another example of the clutch means of the present invention.

In FIG. 7, another embodiment of clutch means C is shown. Oil chambers 5 and 6 are formed at both sides of piston 13 disposed in clutch case 44. Oil chamber 5 contains springs (for example, a plurality of disc springs) for biasing piston 13 to move forward to bias friction plates 7. When pressurized oil is supplied to oil chamber 5 through the oil passage 16 bored in output shaft 2, a resultant force of the spring and oil pressure moves piston 13 forward to bias friction plates 7 so as to cause gear 21 and output shaft 2 to engage with each other. When pressurized oil is supplied to oil chamber 6 through oil passage 17 bored at output shaft 2, piston 13 retracts to release friction plates 7 from being biased so as to disengage gear 21 from output shaft 2.

When engine E is off and, even when the hydraulic action to oil chamber 5 is such that oil chamber 6 is not subjected to oil pressure, the springs can act to somewhat bias friction plates 7. Hence, clutch means C is constructed so that a smaller amount of torque than the torque transmitted by the clutch means C can be transmitted. The amount of torque determined by the biasing force of the spring is designed to be substantially equal to the braking capacity of parking brake device B, which is positioned upstream of clutch means C so that a single parking brake device B can exert the braking action to both the left and right crawler traveling units UL and UR.

A hydraulic circuit, which corresponds to the hydraulic circuit shown in FIG. 6, will be described in more detail in FIG. 8. Hydraulic pump PL and hydraulic motor ML are paired, as are hydraulic pump PR and hydraulic motor MR and connected to each other by independent closed fluid circuits. Independently closed fluid circuits include both a high pressure side and a low pressure side, respectively. A pair of by-pass valves 47 and 48 for connecting the high pressure side and the low pressure side of both independently closed circuits can simultaneously short-circuit at the high pressure side and at the low pressure side. Pressurized oil from charge pump P2 passes through oil filter 59 and is supplied into the closed fluid circuit of hydraulic pump PL and hydraulic motor ML and into the closed fluid circuit of hydraulic pump PR and hydraulic motor MR through check valves, respectively. A relief valve 50 is provided for setting the charge oil pressure. Furthermore, pressurized oil in charge pump P2 is supplied to a directional control valve 46 for by-pass valves 47 and 48. Directional control valve 46 is an electromagnetic system so that when the vehicle travels straight forward, the valve 46 is switched by a control device X (see FIG. 11) to position a as shown. When the vehicle is turned, the valve 46 is switched to position b.

When directional control valve 46 is switched to position a during straight forward movement of the vehicle, the pressurized oil from charge pump P2 is introduced into pilot oil chambers of both by-pass valves 47 and 48, which are switched to the position shown, so that the high pressure side and low pressure side of both independent closed circuits are connected. Accordingly, hydraulic motors ML and MR are connected in parallel with each other so as to enable the number of rotations of motors ML and MR to be coincident with each other. When the vehicle is turned, directional control valve 46 is switched to position b and both by-pass valves 47 and 48 are switched such that the high pressure side and low pressure side of both closed circuits are independent. Therefore, hydraulic motors ML and MR operate independently and receive different oil flow discharged from hydraulic pumps PL and PR, respectively, thereby enabling the number of rotations of motors ML and MR to be individually selected and changed.

Hydraulic pump P3 is separate from charge pump P2 and is used as a hydraulic supply for clutch means C. A clutch switching valve 18 is disposed in a lubrication circuit for hydraulic pump P3 and selectively supplies pressurized oil from this lubrication circuit to oil passage 17 for releasing clutch means C or oil passage 15 for lubrication. Clutch switching valve 18 is controlled by control device X (see FIG. 11) in such a manner that clutch switching valve 18 is switched to position a (as shown) when the vehicle moves straight forward, and to position b when the vehicle is steered so as to turn the vehicle or when the engine stops. When clutch switching valve 18 is put in position a during straight forward movement of the vehicle, pressurized oil from hydraulic pump P3 is guided into the oil passage 15 and supplied as lubricating oil to the lubricated portions in transmission case A. Also, oil passage 17 of clutch means C communicates with an oil tank 61 to engage clutch means C by, for example, a spring in the spring load type clutch C.

When clutch switching valve 18 is switched to position b during steering of the vehicle, pressurized oil from hydraulic pump P3 is guided into oil passage 17 to release clutch means C and stop the supply of lubricating oil to the lubricated portions of transmission case A. A relief valve 19 is provided for setting the release oil pressure for clutch means C. The relieved oil is guided to oil passage 15 to be used as lubricating oil.

In this embodiment, hydraulic motors ML and MR and hydraulic pumps PL and PR are of a variable displacement type and are adapted to have an angle of the swash plates change in two steps in the same direction by simultaneously projecting or retracting the operating cylinders 57 and 58 provided at hydraulic motors ML and MR. Pressurized oil to charge pump P2 is adapted to be supplied to operating cylinder; 57 and 58 through a motor control valve 45. When motor control valve 45 is switched to position a (as shown), a spring in operating cylinders 57 and 58 position the swash plates of motors ML and MR at a predetermined angle. When motor control valve 45 is switched to position b, the pistons in operating cylinders 57 and 58 of hydraulic motors ML and MR are projected by pressurized oil so as to increase the angle of the swash plate in each motor ML and MR. The motor control valve 45 is switched by a sub-speed-change switch provided in the vicinity of the driving cab, thereby enabling the motor speed to be changed in two steps.

Oil cooler 60 cools drained oil. An operating oil tank 61, in this embodiment, is separate from the lubricating oil tank (not shown) formed in transmission case A. The lubricating oil in transmission case A is taken in by hydraulic pump P3 through an oil filter 62 and is used as pressurized oil for clutch means C. Variable displacement hydraulic pump P1 is driven together with hydraulic pump P3 by engine E. Variable displacement hydraulic pump P1 is connected to a hydraulic motor 44 for a working machine W through a closed circuit so as to enable the speed of working machine W to be controlled in a stepless manner by changing the capacity of pump P1.

Figure 8:
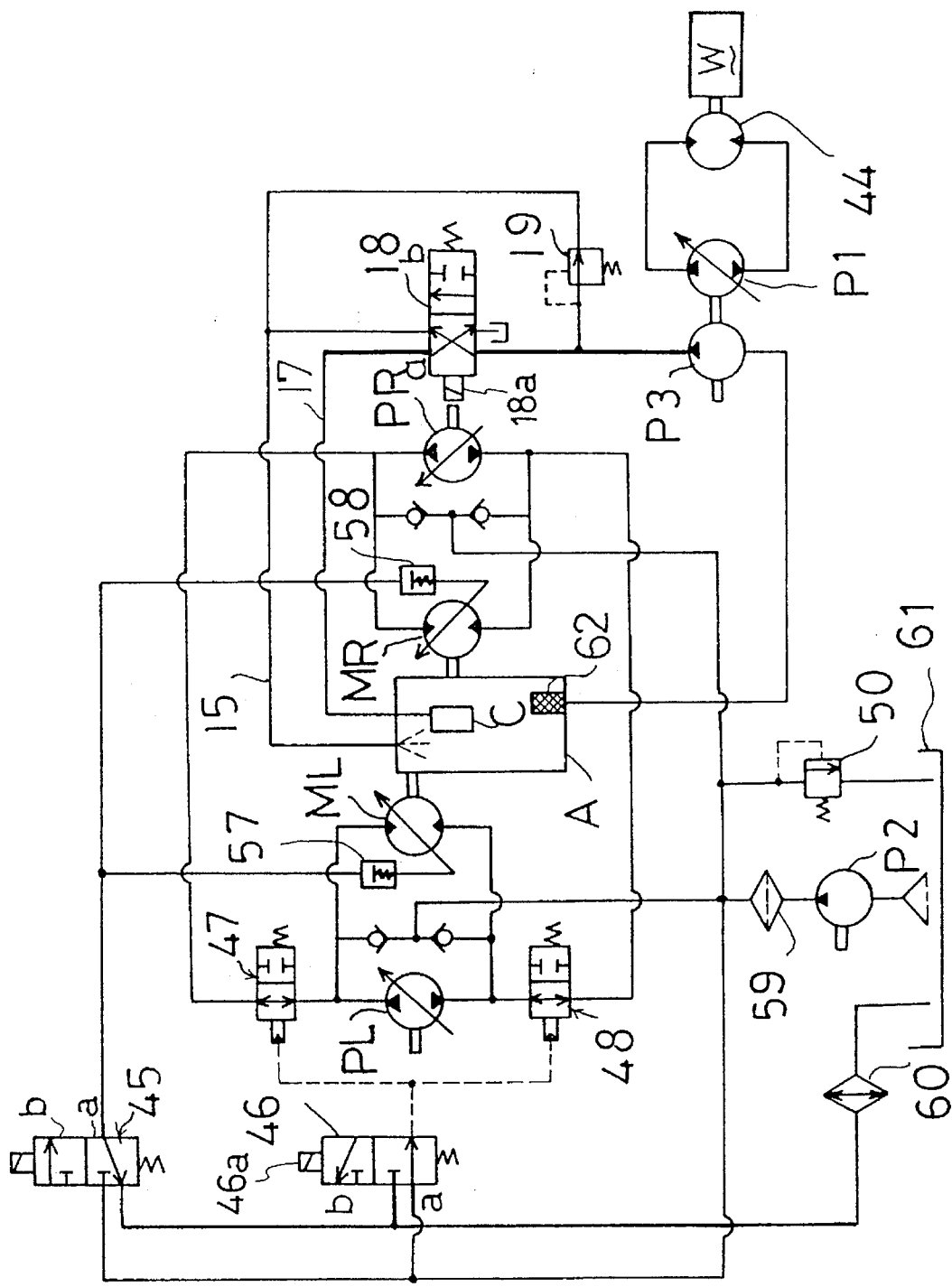
FIG. 8 is a hydraulic circuit diagram for the clutch means shown in FIG. 6.
Figure 9:
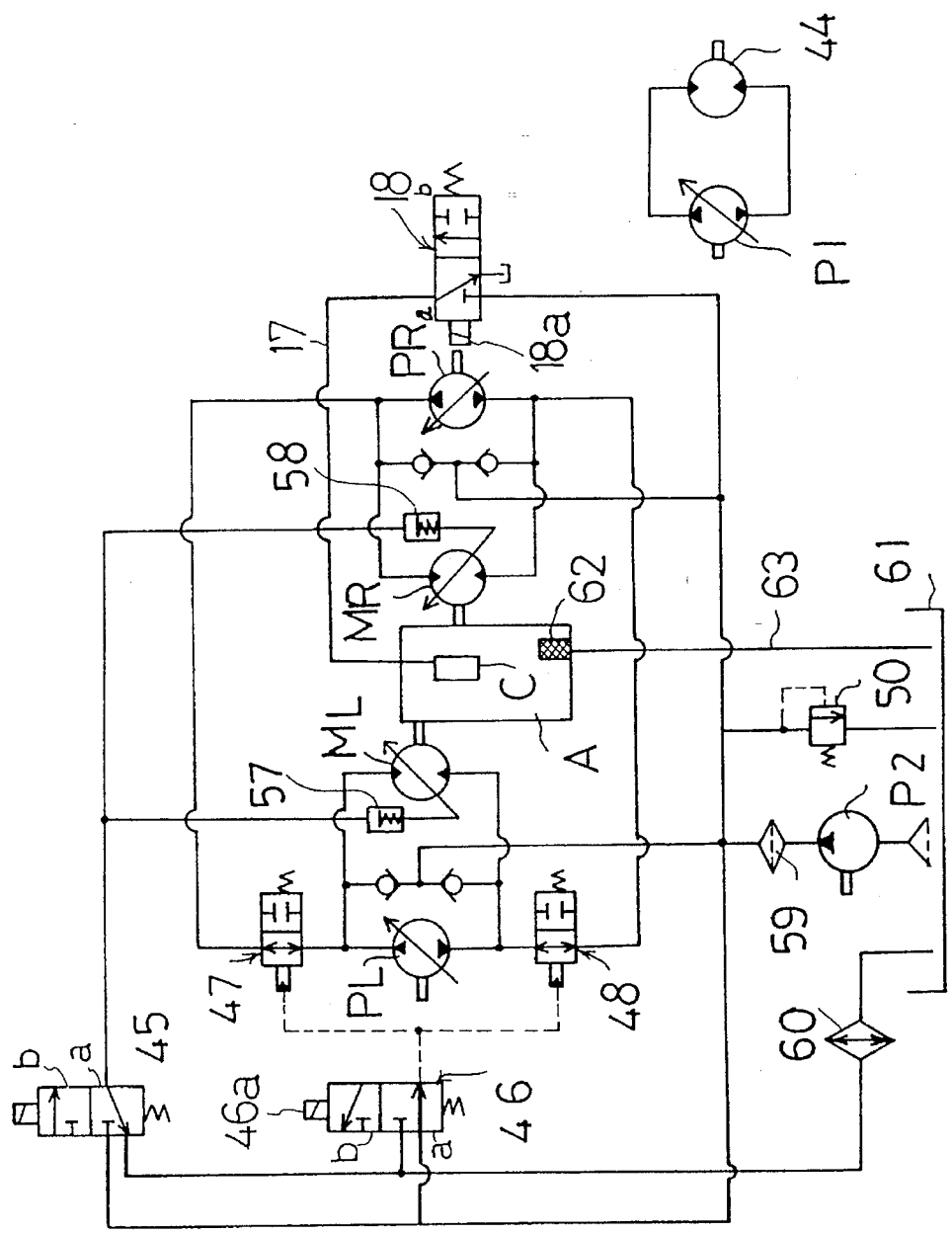
FIG. 9 is another hydraulic circuit diagram for the clutch means shown in FIG. 6.

Charge pump P2 in the embodiment of FIG. 9, provides a hydraulic fluid for clutch means C. The circuit shown in FIG. 9 varies from the circuit shown in FIG. 8 in that the valve function of clutch switching valve 18 is different. In particular, oil passage 15 is not used and the lubricated portions in transmission case A are lubricated by being soaked in oil. In addition, transmission case A and operating oil tank 61 communicate freely with each other through oil filter 62 and oil piping 63. Similar features to those described with respect to FIG. 8 are designated with the same reference numerals and are not described in detail again.

Figure 10:
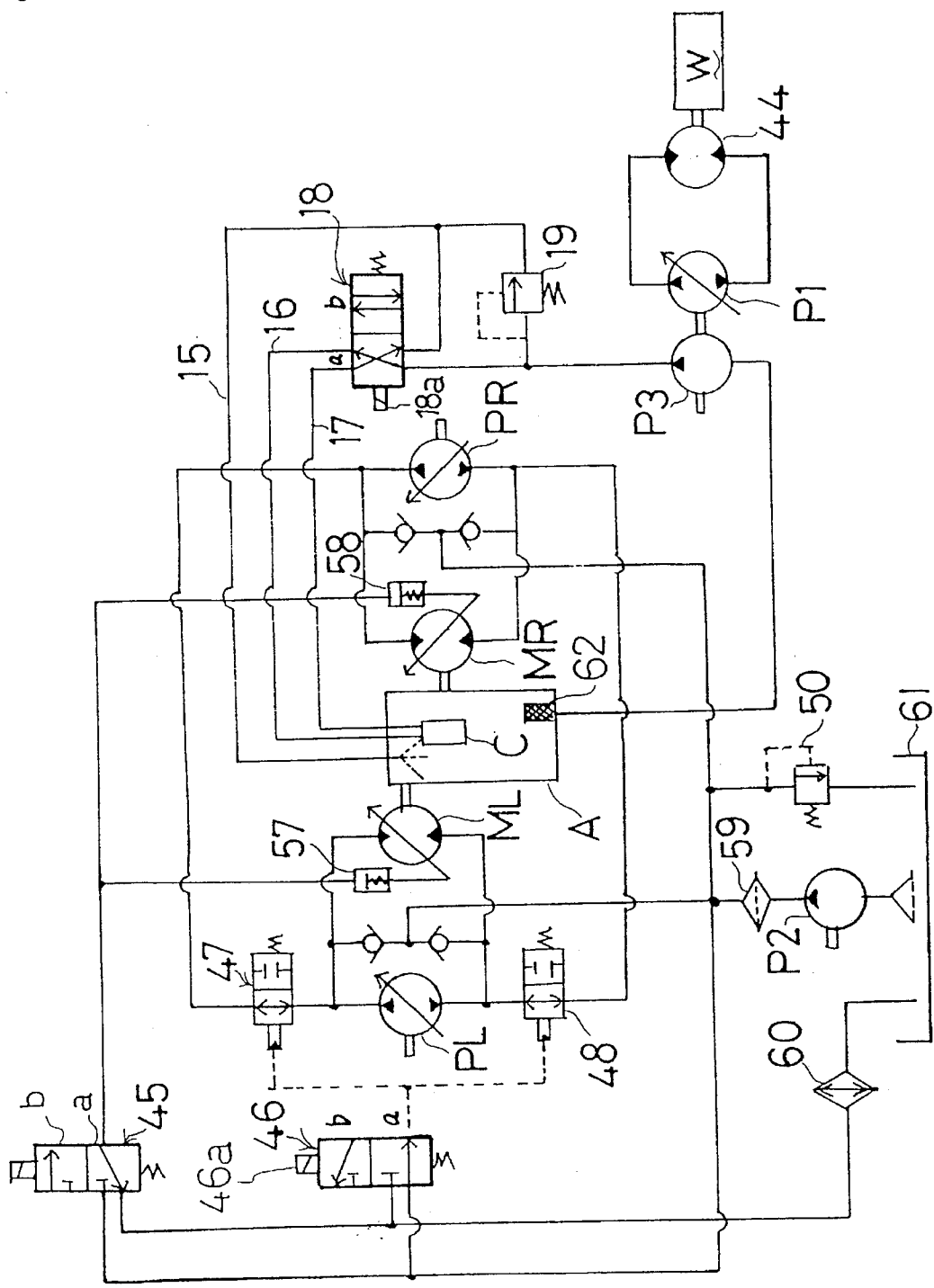
FIG. 10 is a hydraulic circuit diagram for the clutch means shown in FIG. 7.

FIG. 10 shows a hydraulic circuit corresponding to that shown in FIG. 7, which has hydraulic pump P3 as the hydraulic supply only for clutch means C, similar that shown in FIG. 8. Clutch switching valve 18 is interposed in the lubrication circuit for hydraulic pump P3 and is switched to position a (as shown) when the vehicle moves straight forward to supply pressurized oil from hydraulic pump P3 to oil passage 17 which is connected to oil chamber 6 at clutch means C. At the same time, oil in oil passage 16, connected with oil chamber 5, flows into oil passage 15 and is discharged as lubricating oil into transmission case A.

When the vehicle is being steered, pressurized oil from hydraulic pump P3, when clutch switching valve 18 is switched to position b is supplied to oil passage 16 connected to oil chamber 5 at clutch means C. Relief valve 19 sets the operating oil pressure for clutch means C. The oil relieved from relief valve 19 is adapted to be guided into oil passage 15, which is connected to the lubricated portions surrounding clutch means C. The rest of the hydraulic circuit shown in FIG. 10 corresponds to FIG. 8, and the common features share the same reference numerals and description as discussed above with respect to FIG. 8.

Figure 11:
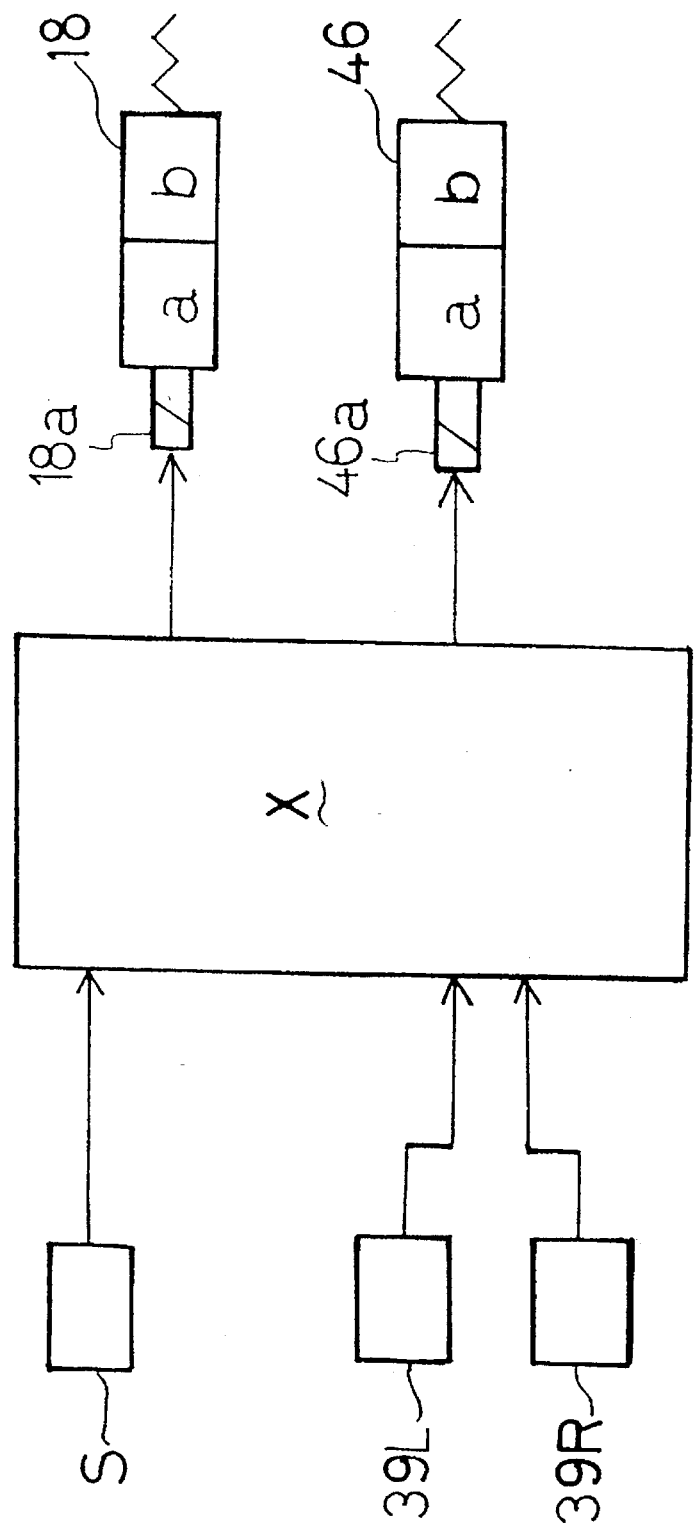
FIG. 11 is a control block diagram of a controller.

Referring now to FIG. 11, a block diagram of control device X will be discussed below. As discussed above, steering unit 9 steers the vehicle by having the rotational direction of the hydraulic motors MR and ML in different directions from each other. Steering unit 9 has a steering detector S for detecting whether steering device 9 is being steered (that is, turned) or not being steered (that is, moving straight forward).

Figure 12:
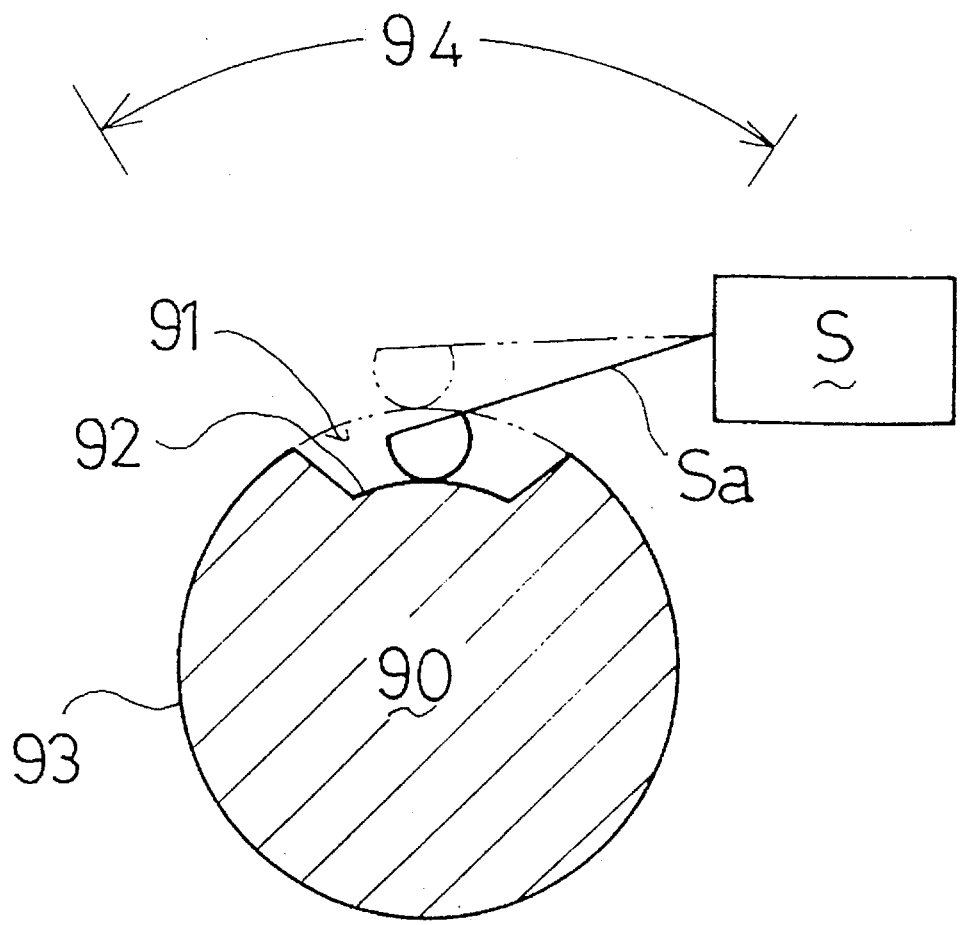
FIG. 12 is a schematic diagram of an area around the steering detector.

A preferred embodiment of steering unit 9 is shown in FIG. 12. Namely, steering unit 9 is provided at its base with a shaft 90 which is rotatable as it is switched from not being steered (straight forward movement of the vehicle) to being steered (turning of the vehicle). A recess 91 is provided at a circumferential portion of shaft 90. Thus, a smaller diameter portion 92 and a larger diameter portion 93 are formed on the respective circumference of shaft 90.

Steering detector S is mounted in a vicinity of shaft 90 and has a limit switch with an operating piece Sa. Operating piece Sa slidably contacts the respective circumference of shaft 90 so that when operating piece Sa extends into smaller diameter portion 92 on shaft 90 as shown by the solid line, steering unit 9 is positioned for straight forward movement position. Accordingly, the steering detector S detects such straight forward movement position. Also, as shown in phantom, when operating piece Sa slidably contacts the larger diameter portion 93, shaft 90 of steering unit 9 is positioned in the steering operation position. Again, steering detector S detects such steering position. Recess 91 is formed in shaft 90 such that the operating piece Sa defines a range 94 for setting the timing for the straight forward movement and steering states of steering unit 9. The extent of range 94 can coincidence with the play of steering unit 9.

At the axial ends of second reduction shafts 11L and 11R at the exterior of transmission case A, rotation number detectors 39L and 39R (for example, electromagnetic pickup detectors), are mounted to detect the number of rotations of left and right hydraulic motors ML and MR and the number of rotations of axles 10L and 10R. A signal from steering detector S and signals from rotation number detectors 39L and 39R are sent to control device X.

Control device X mainly comprises (1) a circuit for amplifying the input signals from steering detector S and rotation number detectors 39L and 39R, (2) a circuit for comparison-computing values of the rotation number detectors 39L and 39R, and (3) a circuit for outputting excitation signals on the basis of the computation results with respect to a solenoid 18a of clutch switching valve 18 and a solenoid 46a of directional control valve 46. Control device X outputs the excitation signals for switching solenoid 18a of clutch switching valve 18, which can be an electromagnetic clutch switching value, and solenoid 46a of the directional control valve 46 to position a in order to engage clutch means C upon receiving a straight forward moving signal from steering detector S. As the result, left and right axles 10L and 10R are continuously driven at the same rotational speed regardless of the condition of the road surface on which the vehicle is traveling.

Also, when supplied with the steering detection signal from steering detector S, control unit X releases clutch means C and stops producing excitation signals in order to switch clutch switching valve 18 and directional control valve 46 to the b position. As a result, the direction of rotation and the quantity of rotations of left and right axles 10L and 10R are optionally changed by control of each hydraulic motor ML or MR, thereby enabling the vehicle to be easily steered at a desired turning radius.

When steering unit 9 is returned from the steering (or turning) state to the straight forward movement state, steering detector S issues a straight forward movement signal. Control device X receives the straight forward movement detection signal to comparison-compute the quantity of rotations of left and right hydraulic motors ML and MR (and therefore of axles 10L or 10R). When the detected difference therebetween is nearly zero, the excitation signal is output from the control device X for switching solenoid 18a of clutch switching valve 18 and solenoid 46a of differential control valve 46 so as to automatically engage clutch means C. Hence, clutch means C is protected from excessive load from axles 10L and 10R.

Figure 13:
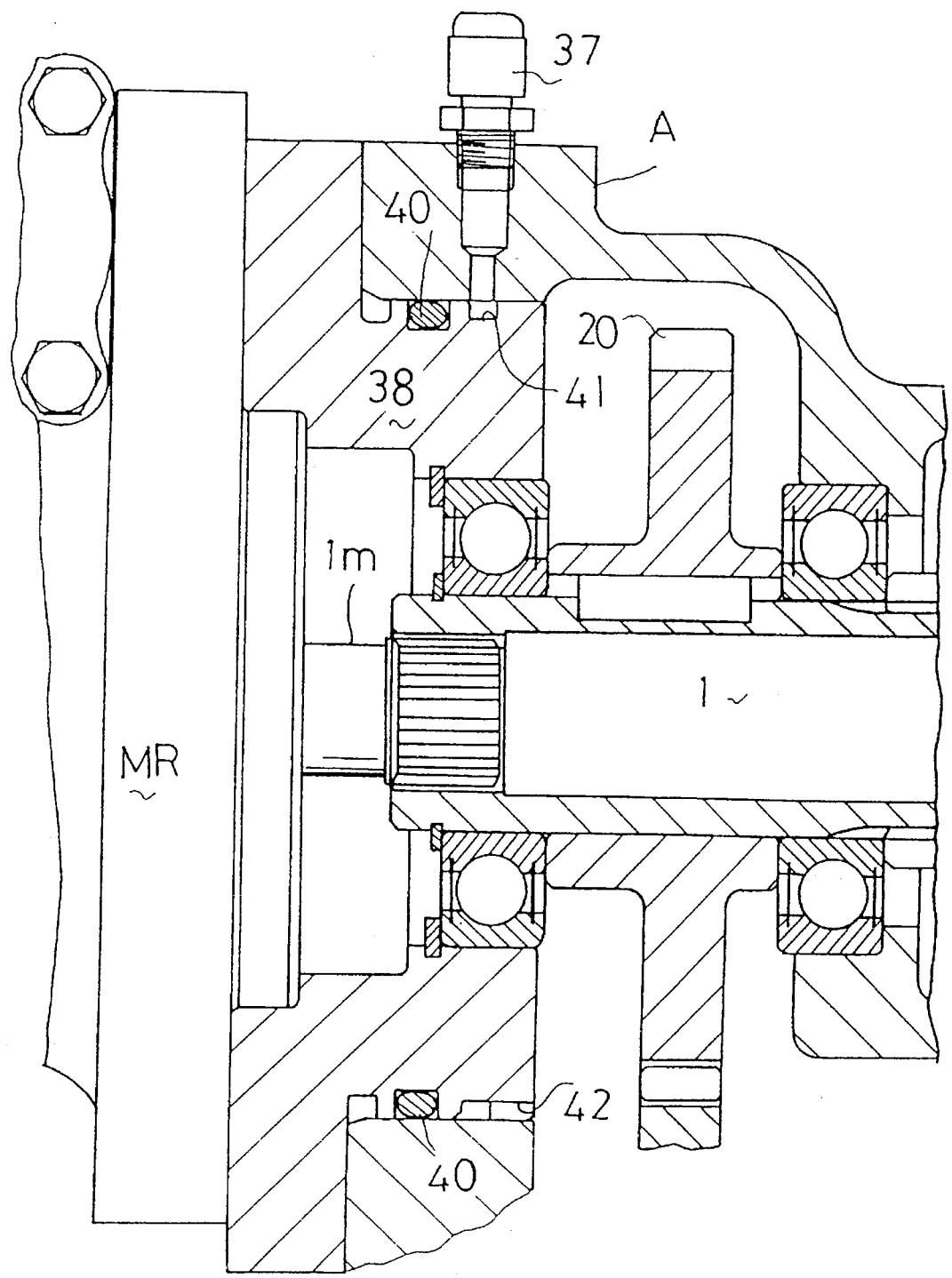
FIG. 13 is a cross-sectional front view of an air duct connected to a breather.
Figure 14:
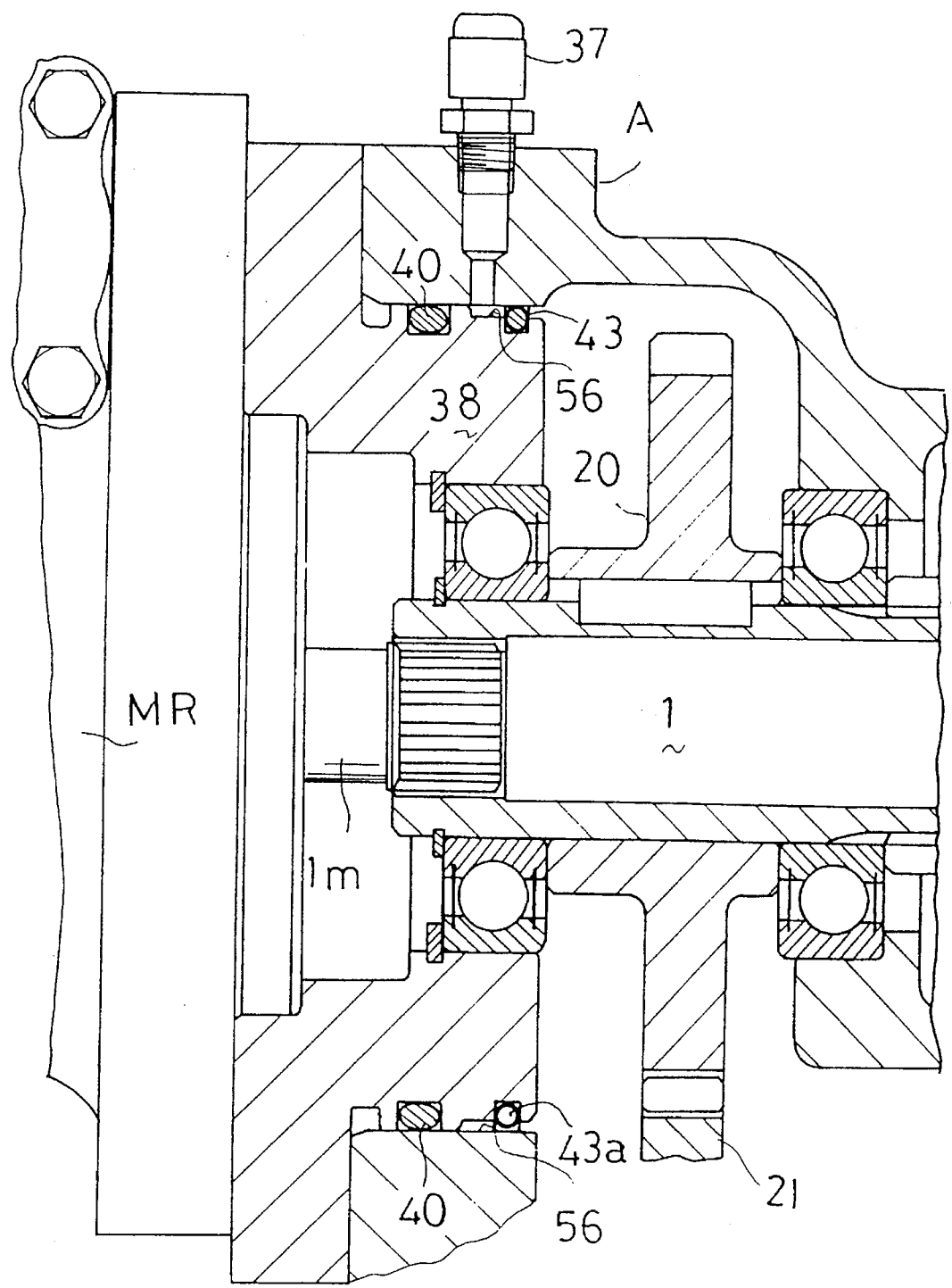
FIG. 14 is a cross-sectional front view of a modified embodiment of the air duct connected to the breather.

FIGS. 13 and 14 show an air duct with respect to a breather 37. In FIG. 13, in order to mount hydraulic motor MR, between a bracket 38, which is fixed to transmission case A, and transmission case A, an O-ring 40 is fitted onto the outside of bracket 38. An air duct groove 41 is bored into the complete circumference of bracket 38 in a circular arc axially inward of bracket 38. At a lower end of air duct groove 41 is provided a cutout 42 so as to ventilate air into transmission case A through cutout 42. FIG. 14 is similar to FIG. 13 in that an O-ring 40 is fitted onto the outside of bracket 38. However, a stepped portion 56 is formed around an opening of breather 37 and a C-shaped ring 43a is fitted into stepped portion 56 to enable air to be ventilated through cutout 43 at the C-shaped ring 43a, thereby reducing oil leakage.

While advantageous embodiments have been chosen to illustrate the invention, it will be understood by those skilled in the art that various changes and modification can be made therein without departing from the scope of the invention as defined in the appended claims.

What is claimed is:

1. A transmission, comprising:

a transmission case;

a first hydraulic motor being disposed on a first side of said transmission case and having a first output shaft with a first rotary axis;

a second hydraulic motor being disposed on a second side of said transmission case and having a second output shaft with a second rotary axis;

first and second axles;

a pair of drive trains, said first and second hydraulic motors being independently drivingly connected to said first and second axles by said drive trains, said first output shaft being disposed relative to said second output shaft such that said first rotary axis is offset from said second rotary axis, one of said drive trains including a second side rotary member, said second side rotary member disposed within said transmission case, said second side rotary member being disposed coaxially with said first output shaft;

a clutch means disposed between said second side rotary member and said first output shaft, wherein said clutch means engages said drive trains when a number of rotations of said first out put shaft is substantially equal to a number of rotations of said second out put shaft; and a parking brake disposed on said second output shaft.

2. A transmission as set forth in claim 1, wherein said drive train comprises rotary members, said rotary members including said first and second output shafts and said second side rotary member.

3. A transmission as set forth in claim 1, wherein said clutch means comprises:

a hydraulic multi-disc clutch of a spring load type having a spring, said spring having an engaged position and an disengaged position, said clutch means having an engaged state and a released state, wherein said clutch means is in said engaged state when said spring is in said engaged position and said clutch means is in said released state when said spring is in said disengaged position.

4. A transmission as set forth in claim 1, further comprising:

a rotation number detection means for detecting said number of rotations of said first and second shafts of said first and second hydraulic motors; and a control device for comparing said detected number of rotations of said first and second shafts of said first and second hydraulic motors, wherein said control device operates said clutch means to automatically engage said drive train when a difference between said number of rotations of said first shaft and said number of rotations of said second shaft is substantially zero.

5. A transmission as set forth in claim 1, further comprising a single transmission case having first and second exterior surfaces and first and second interior surfaces, wherein said first and second hydraulic motors are disposed on said first and second exterior surfaces, and said drive train is disposed within said transmission case, said drive train extending along said first and second interior surfaces.

6. A transmission as set forth in claim 1, further comprising:

a single transmission case having an oil level, wherein said drive train and said clutch means are contained in said single transmission case, and said clutch means comprises a hydraulic multi-disc clutch having friction plates and lubricating portions surrounding said friction plates, said clutch means disposed above said oil level in said transmission case, and said clutch means having a lubricating oil discharge port for supplying lubricating oil to said friction plates and said lubricated potations such that when said clutch means engages said rotary members, oil is supplied through said discharge port.

7. A transmission, comprising:

a first hydraulic motor having a first rotational speed;

a second hydraulic motor having a second rotational speed;

a pair of axles;

a drive train for independently drivingly connecting said first and second hydraulic motors and said pair of axles, said drive train comprising rotary members; and a clutch means for controlling engagement of said rotary members, said clutch means being disposed between said rotary members, wherein said clutch means engages said rotary members only when said first rotational speed is substantially equal to said second rotational speed.

8. A transmission as set forth in claim 7, further comprising:

a traveling device connected to each of said pair of axles.

9. A transmission as set forth in claim 7, wherein power flows from said first and second hydraulic motors to said pair of axles and wherein said clutch means is positioned upstream in said flow of power through said transmission.

10. A transmission as set forth in claim 7, wherein one of said rotary members is a first output shaft of said first hydraulic motor.

11. A transmission as set forth in claim 10, wherein said second hydraulic motor has a second output shaft, said first output shaft of said first hydraulic motor has a first rotary axis and said second output shaft of said second hydraulic motor has a second rotary axis, said first output shaft is disposed relative to said second output shaft such that said first rotary axis is offset from said second rotary axis, one of said rotary members disposed at one side of said drive train is disposed coaxially with said first output shaft at another side of said drive train, said clutch means is disposed between said one rotary member and said first output shaft, and a parking brake is provided on said second output shaft.

12. A transmission as set forth in claim 7, wherein one of said rotary members is provided with a parking brake.

13. A transmission as set forth in claim 12, wherein said first hydraulic motor has a first output shaft and said second hydraulic motor has a second output shaft and said one rotary member provided with a parking brake is one of said first and second output shafts.

14. A transmission as set forth in claim 7, wherein said drive train comprises a pair of drive trains, one of said drive trains is provided with a parking brake, and wherein said clutch means comprises a spring loaded type clutch which is engaged by a spring.

15. A transmission as set forth in claim 7, wherein said drive train comprises, a rotational speed detection means for detecting the number of rotations of each of said first and second hydraulic motors, and a control device for comparing said detected number of rotations of each of said first and second hydraulic motors such that when a difference between said detected number of rotations is approximately zero, said clutch means is automatically engaged.

16. A transmission as set forth in claim 7, further comprising:

a single transmission case having first and second exterior surfaces, and first and second interior surfaces, wherein said first and second hydraulic motors are disposed on said first and second exterior surfaces of said transmission case, and wherein said drive train is disposed within said transmission case and extends along said first and second interior surfaces of said transmission case.

17. A transmission as set forth in claim 7, further comprising:

a single transmission case having an oil level, said drive train and said clutch means being disposed within said single transmission case,. and wherein said clutch means comprises a hydraulic multi-disc type clutch with friction plates and lubricated portions surrounding said friction plates, wherein said clutch means is disposed above said oil level in said transmission case, said clutch means having a lubricating oil discharge port for supplying lubricating oil to said friction plates and said lubricated portions, and wherein oil is supplied through said discharge port when said clutch means is in an engaged position.

18. A transmission according to claim 7, wherein said drive train comprises a plurality of drive trains.

19. A transmission, comprising:

a first hydraulic motor;

a second hydraulic motor;

a pair of axles;

a drive train for independently drivingly connecting said first and second hydraulic motors and said pair of axles;

a rotation detection means for detecting a first number of rotations of said first hydraulic motor and for detecting a second number of rotations of said second hydraulic motor, said rotation detection means being disposed at said drive train; and a clutch means disposed at said drive train, wherein said clutch means automatically engages said drive train when said rotation detection means detects that said first and second number of rotations are substantially equal.

20. A transmission as set forth in claim 19, further comprising, a first traveling device connected to one of said pair of axles, and a second traveling device connected to another of said pair of axles.

21. A transmission as set forth in claim 19, wherein said drive train comprises a plurality of drive trains.

22. A transmission as set forth in claim 19, wherein said drive train comprises rotary members, and wherein said clutch means automatically engages said rotary members of said drive train when said first and second number of rotations are substantially equal.

23. A transmission as set forth in claim 22, wherein a flow of power in said drive train is transmitted from said first and second hydraulic motors to said pair of axles, and wherein said clutch means is disposed at said rotary members upstream in said flow of power, and said clutch means is disposed between said rotary members.

24. A transmission as set forth in claim 22, wherein one of said rotary members is a first output shaft of said first hydraulic motor.

25. A transmission as set forth in claim 24, wherein said second hydraulic motor has a second output shaft, wherein said first output shaft of said first hydraulic motor has a first rotary axis and said second output shaft of said second hydraulic motor has a second rotary axis, said first output shaft is disposed relative to said second output shaft such that said first rotary axis is offset from said second rotary axis, one of said rotary members disposed at one side of said drive train is disposed coaxially with said first output shaft at another side of said drive train, said clutch means is disposed between said one rotary member and said first output shaft, and a parking brake is provided on said second output shaft.

26. A transmission as set forth in claim 22, wherein one of said rotary members is provided with a parking brake.

27. A traveling transmission as set forth in claim 26, wherein said first hydraulic motor has a first output shaft and said second hydraulic motor has a second output shaft, said one rotary member provided with a parking brake is one of said first and second output shafts.

28. A transmission as set forth in claim 19, wherein said drive train comprises a plurality of drive trains and a parking brake is disposed at one of said drive trains, and wherein said clutch means comprises a spring loaded type clutch which is engaged by a spring.

29. A transmission as set forth in claim 19, further comprising:
a single transmission case having first and second exterior surfaces and first and second interior surfaces, wherein said first and second hydraulic motors are disposed on said first and second exterior surfaces, and
wherein said drive train is disposed within said transmission case and extends along said first and second interior surfaces of said transmission case.

30. A transmission as set forth in claim 19, further comprising:
a single transmission case having an oil level,
wherein said drive train and said clutch means are contained within said single transmission case, and
said clutch means comprises a hydraulic multi-disc clutch having friction plates and lubricated portions surrounding said friction plates, said clutch means is disposed above said oil level in said transmission case, said clutch means: having a lubricating oil discharge port for supplying a lubricating oil to said friction plates and said lubricated portions such that when said clutch means engages said rotary members, oil is supplied through said discharge port.

31. A transmission, comprising:
a first hydraulic motor having a first output shaft rotated at a first rotational speed;
a second hydraulic motor having a second output shaft rotated at a second rotational speed;
a pair of axles;
a drive train for independently drivingly connecting said first and second hydraulic motors and said pair of axles, said drive train including,
a first rotary member driven by said first output shaft of said first hydraulic motor, and
a second rotary member driven by said second output shaft of said second hydraulic motor, wherein said first rotary member is disposed coaxially with said second rotary member;
a clutch means for controlling engagement of said first and second rotary, members, said clutch means being disposed between said first and second rotary members, wherein said clutch means engages said first and second rotary members when said first rotational speed is substantially equal to said second rotational speed; and
a parking brake provided on an end portion of said second output shaft, wherein said first output shaft has a first rotary axis and said second output shaft has a second rotary axis, wherein said first output shaft is disposed relative to said second output shaft such that said first rotary axis is offset from said second rotary axis.

32. A transmission, comprising:
a first hydraulic motor having a first output shaft having a first rotary axis;
a second hydraulic motor having a second output shaft having a second rotary axis, wherein said first output shaft is disposed relative to said second output shaft such that said first rotary axis is offset from said second rotary axis;
a pair of axles;
a drive train for independently drivingly connecting first and second hydraulic motors and said pair of axles, wherein said drive train comprises rotary members and one of said rotary members disposed at one side of said drive train is disposed coaxially with said first output shaft at another side of said drive train;
a rotation detection means for detecting a first number of rotations of said first hydraulic motor and a second number of rotations of said second hydraulic motor, said rotation detection means being disposed at said drive train;
a clutch means disposed between said one rotary member and said first output shaft, wherein said clutch means automatically engages said one rotary member and said first output shaft when said first and second number of rotations are substantially equal; and
a parking brake provided on said second output shaft.

33. A transmission, comprising:
a first hydraulic motor;
a second hydraulic motor;
a pair of axles;
a drive train for independently drivingly connecting said first and second hydraulic motors and said pair of axles;
a rotation detection means for detecting a first number of rotations of said first hydraulic motor and for detecting a second number of rotations of said second hydraulic motor;
a hydraulic pump for supplying operating oil to said first and second hydraulic motors;
an operating unit for controlling a discharge amount and direction of operating oil from said hydraulic pump to said first and second hydraulic motors;
a steering wheel operably connected to said operating unit such that said first and second number of rotations are changed to different numbers of rotations from each other when said steering wheel is steered and said first and second number of rotations are kept at the same number of rotations with each other when said steering wheel is not steered;
a steering detector means for detecting that said steering wheel is steered or not steered; and
a clutch means disposed at said drive train, wherein said clutch means automatically engages said drive train, wherein said clutch means automatically engages said drive train when said steering detector means detects that said steering wheel is not steered and when said rotation detection means detects that said first and second number of rotations are substantially equal.

34. A transmission, comprising:
a first hydraulic motor having a first rotational speed;
a second hydraulic motor having a second rotational speed;
first and second axles;
a drive train for independently drivingly connecting said first and second hydraulic motors and said first and second axles, wherein said first axle achieves said first rotational speed by said first hydraulic motor and said second axle achieves said second rotational speed by said second hydraulic motor;
a hydraulic pump for supplying operating oil to said first and second hydraulic motors;
an operating unit for controlling a discharge amount and direction of operating oil from said hydraulic pump to said first and second hydraulic motors;
a steering wheel operably connected to said operating unit such that said first and second rotational speeds are changed to different rotational speeds from each other when said steering wheel is steered and said first and second rotational speeds are each kept at the same speed when said steering wheel is not steered;

a steering detector means for detecting that said steering wheel is steered or not steered; and a clutch means disposed at said drive train, wherein said clutch means automatically engages said drive train when said steering detector means detects that said steering wheel is not steered and said first and second rotational speeds are substantially equal.

35. A transmission, comprising:

a first hydraulic motor;

a second hydraulic motor;

first and second axles;

a drive train for independently drivingly connecting said first and second hydraulic motors and said first and second axles, wherein said first axle achieves a first rotational speed by said first hydraulic motor and said second axle achieves a second rotational speed by said second hydraulic motor;

a hydraulic pump for supplying operating oil to said first and second hydraulic motors;

an operating unit for controlling the discharge amount and direction of operating oil from said hydraulic pump to said first and second hydraulic motors;

a steering wheel operably connected to said operating unit such that said first and second rotational speeds are changed to be different from each other when said steering wheel is steered and said first and second rotational speeds are kept at the same speeds with each other when said steering wheel is not steered; and a clutch means disposed at said drive train, wherein said clutch means automatically engages said drive train when said steering wheel is not steered and said first rotational speed is substantially equal to said second rotational speed.

* * * * *